(12) United States Patent
Find

(10) Patent No.: US 8,529,854 B2
(45) Date of Patent: Sep. 10, 2013

(54) REMOVAL OF CARBON DIOXIDE FROM A FEED GAS

(75) Inventor: Rasmus Find, Vejle (DK)

(73) Assignee: Union Engineering A/S, Fredericia (DK)

( * ) Notice: Subject to any disclaimer, the term of this patent is extended or adjusted under 35 U.S.C. 154(b) by 543 days.

(21) Appl. No.: 12/682,638

(22) PCT Filed: Oct. 13, 2008

(86) PCT No.: PCT/DK2008/000359
§ 371 (c)(1),
(2), (4) Date: Jul. 1, 2010

(87) PCT Pub. No.: WO2009/046721
PCT Pub. Date: Apr. 16, 2009

(65) Prior Publication Data
US 2010/0278711 A1 Nov. 4, 2010

(30) Foreign Application Priority Data
Oct. 12, 2007 (DK) .................................. 2007 01474

(51) Int. Cl.
*B01D 53/62* (2006.01)
*B01D 53/96* (2006.01)

(52) U.S. Cl.
USPC ............ 423/220; 423/226; 423/232; 423/233

(58) Field of Classification Search
USPC .................................... 423/220, 226, 232, 233
See application file for complete search history.

(56) References Cited

U.S. PATENT DOCUMENTS

| | | | | |
|---|---|---|---|---|
| 3,824,766 A * | 7/1974 | Valentine et al. | | 95/163 |
| 4,085,192 A * | 4/1978 | Van Scoy | | 95/179 |
| 4,273,620 A * | 6/1981 | Knobel | | 203/18 |
| 5,344,627 A * | 9/1994 | Fujii et al. | | 423/220 |
| 2004/0107728 A1 * | 6/2004 | Lemaire et al. | | 62/622 |
| 2004/0237528 A1 | 12/2004 | Nurmia | | |

FOREIGN PATENT DOCUMENTS

| | | |
|---|---|---|
| DE | 3639779 A1 | 6/1988 |
| WO | 9521683 A | 8/1995 |
| WO | 2007068682 A | 6/2007 |

* cited by examiner

*Primary Examiner* — Stanley Silverman
*Assistant Examiner* — Daniel Berns
(74) *Attorney, Agent, or Firm* — Browdy and Neimark, PLLC

(57) ABSTRACT

The present invention relates to a new process for removal of carbon dioxide from a feed gas, wherein the feed gas is fed to and concentrated in a stripper column (A) before condensation of the gaseous carbon dioxide. The present invention also relates to different uses of the removed carbon dioxide and to a plant for removal of carbon dioxide from the feed gas.

18 Claims, 4 Drawing Sheets

REMOVAL OF CARBON DIOXIDE FROM A FEED GAS

The present invention relates to a novel process for removal of carbon dioxide from a feed gas and to a plant for performing said removal. The present invention also relates to different uses of the carbon dioxide recovered by the process.

BACKGROUND OF THE INVENTION

Carbon dioxide is a well-known gas, which is present in the atmosphere. It is released to the atmosphere in large amounts by fermentation processes, limestone calcinations, and all forms of combustion processes of carbon and carbon compounds. In recent decades, the attention in respect of said emission has been rising, because of the environmental problem due to future climate change via the Greenhouse effect. Consequently, extensive work has been performed over the years in order to develop processes for the removal of carbon dioxide from combustion gases. If possible, a subsequent recovery of carbon dioxide may make those processes economically feasible.

One type of conventional process for the recovery of carbon dioxide from a gaseous source is the absorption process, in which carbon dioxide is absorbed in an absorbing agent. In a conventional plant, the carbon dioxide is firstly separated from the rest of the feed gas by absorbing the carbon dioxide in an absorbing agent. Afterwards, the carbon dioxide is separated from the absorbing agent. In cases where a physical absorbing agent is employed, said separation is typically performed by decreasing the pressure in a flash or stripping column. If necessary, the spent absorbing agent is then regenerated before the pressure is increased prior to recycling to the absorbing column. The treated feed gas leaving the absorption column is disposed of to the atmosphere. However, these periodical pressure rises and pressure drops increase the production costs and the investment expenditure for equipment for increasing pressure is of major considerations.

Very surprisingly the present inventors have found that it is possible to remove carbon dioxide from a feed gas, if the feed gas is fed to the stripper column instead of the absorption column. This is due to the fact that when the feed gas in the stripper column strips an absorption agent, in which carbon dioxide is absorbed, the concentration of carbon dioxide in the gas leaving the stripper column is increased. As a consequence of this increased concentration it is possible to condensate the gaseous carbon dioxide subsequently.

Another major advantage of the present invention is that it is possible to operate the plant at constant pressure. By this mode of operation the investment expenditure for providing equipment for increasing pressure is dispensed with, and no production costs for altering the pressure within the plant can be found.

DESCRIPTION OF THE INVENTION

Figure 1:
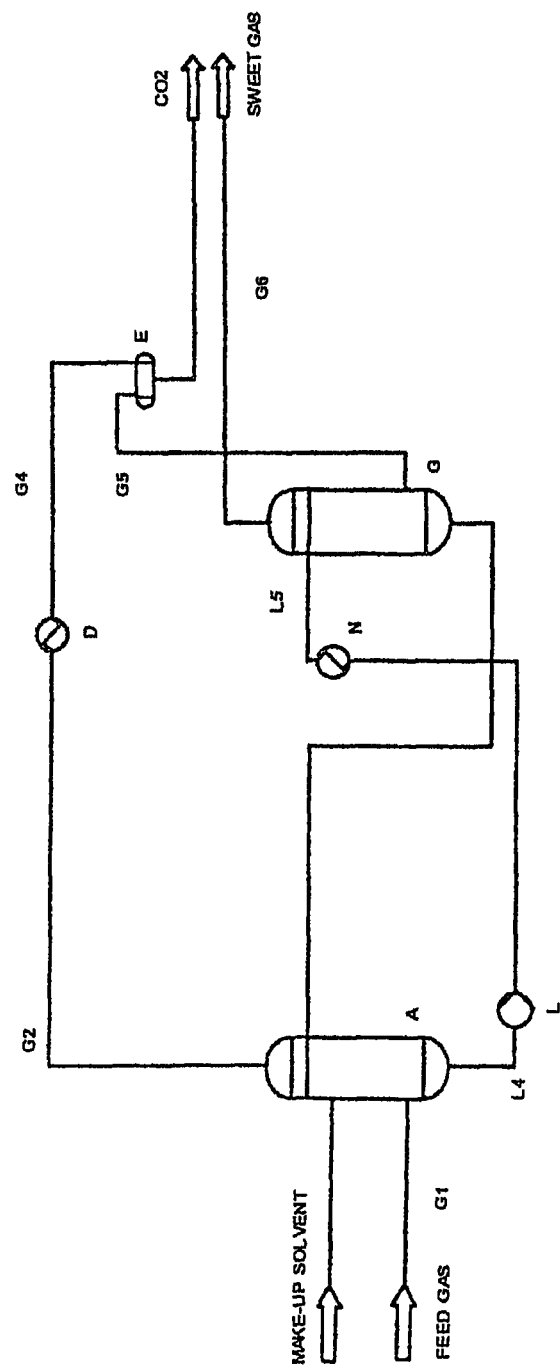
FIGS. 1, 1a, 2, and 2a are flow diagrams in accordance with the present invention.
Figure 1A:
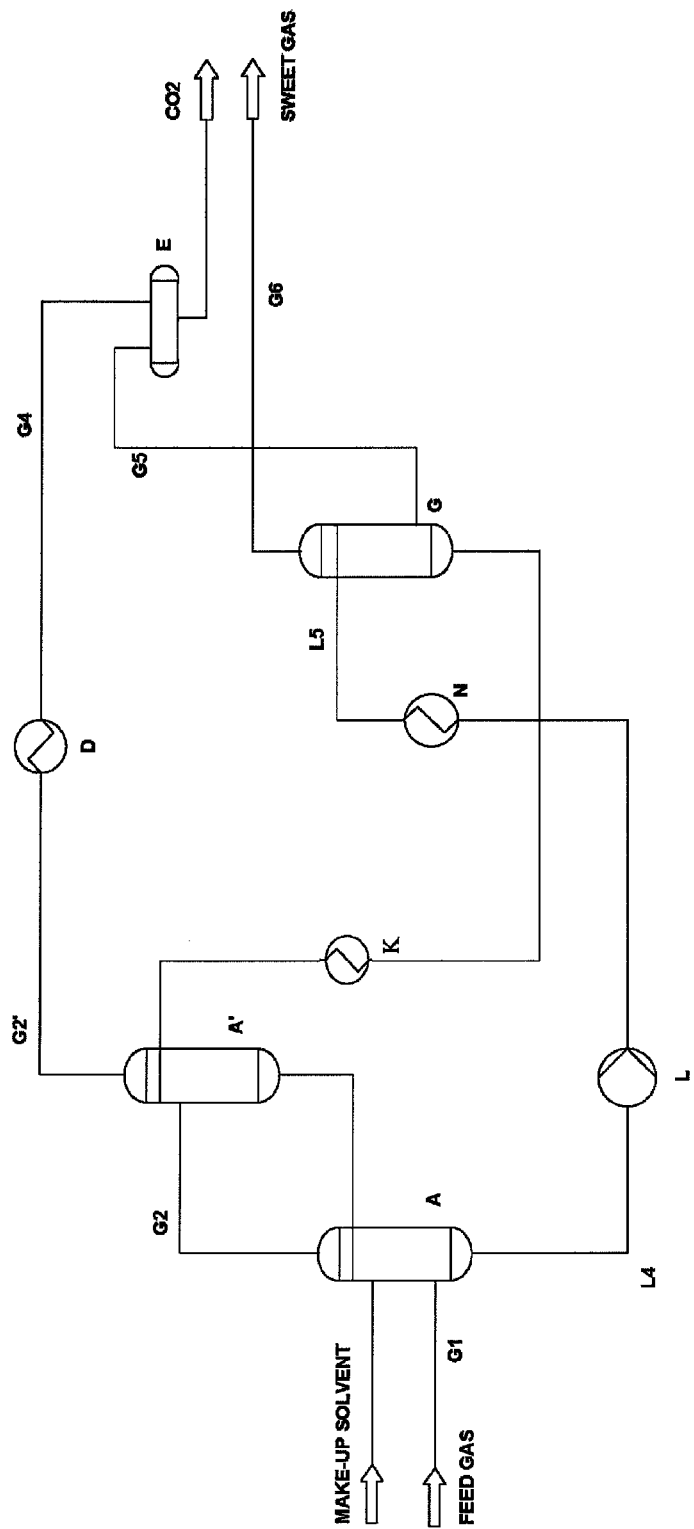

In one aspect, the present invention relates to a process for removal of carbon dioxide from a feed gas. The process according to the present invention comprises the steps of:
  a. feeding a feed gas and a recycled absorbing agent containing carbon dioxide to a stripper column,
  b. stripping said recycled absorbing agent containing carbon dioxide with the feed gas and thereby obtaining a gas having a higher concentration of carbon dioxide than the feed gas and a liquid of absorbing agent comprising small amounts of carbon dioxide,
  c. cooling the gas obtained in step b,
  d. separating the cooled gas obtained in step c into a carbon dioxide rich liquid and a carbon dioxide containing gas,
  e. cooling the liquid of absorbing agent obtained in step b,
  f. absorbing carbon dioxide from the gas obtained in step d by means of the absorbing agent obtained in step e, by which the gas is separated into a gas, which may be disposed of, and a liquid of absorbing agent containing carbon dioxide, and
  g. increasing the temperature and/or reducing the pressure of the liquid obtained in step f before recycling it to the stripper column.

Depending on the nature of the feed gas, it may be profitable to adjust the pressure of the feed gas prior to feeding the gas to the stripper column in step a of the present process. A person skilled in the art is able to determine the most advantageous operating pressure depending on the chemical composition, the temperature of the feed gas and the selection of an absorbing agent. However, it is preferred that the pressure of the feed gas is above 3 bar, more preferred between 6 and 160 bar, and even more preferred between 10 and 40 bar.

The feed gas may be any gaseous stream comprising carbon dioxide. However, gases originating from upstream hydrogen plants or downstream Pressure Swing Adsorption (PSA) units and gases originating from power plants are preferred as feed gases in the present process.

In the stripper column, the recycled liquid absorbing agent, which is recycled from the absorption column situated at a later stage in the process, is stripped by means of the feed gas (step b) in order to transfer carbon dioxide from the liquid absorbing agent into the gaseous phase. Consequently, the concentration of carbon dioxide in the gas leaving the stripper column is higher than the concentration in the feed gas. However, it is unavoidable that absorbing agent to some extent is also transferred to the gaseous phase.

The gas leaving the stripper column is then cooled in step c to a temperature, at which the small amount of absorbing agent and carbon dioxide are condensed and removed from the plant as a waste stream or as a product stream, which may or may not require further purification. Alternatively, the condensed liquid may be used as a cooling agent for the process by expansion and re-evaporation. In such case the carbon dioxide rich stream will leave as a gas to be considered as a waste or product and this stream may be further purified.

The remainder non-condensed gas phase is then let into an absorption column, wherein the carbon dioxide is absorbed in the absorbing agent (step f). The absorbing agent used in the absorption step is recycled from the stripper column and is cooled to an appropriate temperature for the absorption process to occur. If necessary, water is removed from the absorbing agent prior to cooling.

Then the temperature of the liquid absorbing agent leaving the absorption column is increased and/or the pressure of said liquid is reduced before it is recycled to the stripper column, in which it is stripped by the feed gas (in step b).

The absorbing agent employed in the process is a physical absorbing agent. Preferably, the absorbing agent is selected among methanol, SELEXOL and aqueous solutions of carbonates, such as sodium carbonate, potassium carbonate, and propylene carbonate, and the like. SELEXOL is a well-known trade name generally known as an acid gas removing solvent, namely a mixture of dimethyl ethers of polyethylene glycol. In a preferred embodiment the physical absorbing agent is methanol.

If water is present in the feed gas and if the absorbing agent is methanol, all of said water is transferred to the liquid absorbing agent in the stripper column during step b of the process. This fact is another major advantage of the present process as compared to conventional processes. Said water may be removed from the absorbing agent by using conventional treatment procedures known within the art, such as distillation, absorption, addition of a drying agent, and the like. It is standard procedure for a skilled person to select the most suitable treatment procedure in a given situation. For instance if an absorbing agent having a low boiling point (as for example methanol) is chosen, any water present is preferably removed by distilling the liquid absorbing agent leaving the stripper column. In another preferred embodiment water is removed from the feed gas before feeding the feed gas to the stripper column.

The liquid obtained in step d of the present process may be a product stream. Therefore, in a preferred embodiment of the present invention the process is a process for producing carbon dioxide as a product.

In one embodiment of the process according to the present invention an intermediate cooling/separating step is incorporated between the steps b and c. In this intermediate step the gas obtained in step b is firstly cooled to a temperature, at which most of the absorbing agent and part of the carbon dioxide are condensed, and said condensed liquid phase is separated from the remaining gaseous phase and recycled to the stripper. Before recycling, however, the temperature of said liquid is increased and/or the pressure of said liquid is reduced. Preferably, the condensed liquid phase is mixed with the liquid obtained in step f before increasing the temperature and/or reducing the pressure. The non-condensed gaseous phase is subsequently further cooled in step c of the present process. This intermediate cooling/separating step may be repeated one, two, three, four, five or six times.

In a preferred embodiment the process of the present invention is performed at constant pressure. In this context the term "constant pressure" is meant to indicate that the pressure measured anywhere in the process is substantially constant. Naturally, it is necessary to compensate for any pressure loss, which always will occur in a plant, and the term "constant pressure" must be understood as to include any minor unavoidable variations. However, even though it is stated that a constant pressure is preferred this statement is not to be interpreted as to exclude the application of the "stripper and absorber principle", wherein the pressure in the absorption column is higher than the pressure in the stripper column.

In another embodiment of the process according to the present invention an intermediate stripping step is incorporated between the steps b and c, in which the gas leaving the stripper column in step b is pressurised before it is used as a stripping agent for stripping the liquid of absorbing agent leaving the absorption column in step f. Afterwards said stripped liquid of absorbing agent is recycled to the stripper column.

Optionally, the above described intermediate stripping step may be performed several times within an additional stripping unit, which comprises several stripper columns consecutively connected. In this additional stripping unit the step is performed by bringing the liquid of absorbing agent obtained in step f in contact with the gas obtained in step b by use of a counter-current flow mode before said gas is cooled in step c and before said liquid is recycled to the stripper column. Hence, if the intermediate stripping step is performed only once, the additional stripper unit comprises only one stripper column. If the intermediate stripping step is performed twice, then the additional stripper unit comprises two columns, and so on. Preferably, the intermediate stripping step is performed one, two, three, four, five or six times times, which means that the stripping unit must comprise one, two, three, four, five or six stripper columns, respectively. However, in some special cases it may be profitable to incorporate as many as ten intermediate stripping steps.

By the term "counter-current flow" as used herein is meant that the gas leaving the stripper column is flowing in the opposite direction than the liquid leaving the absorption column. That is, the gas leaving the stripper column enters the additional stripping unit at the point where the liquid leaving the absorption column leaves the additional stripping unit after having been subjected the treatment occurring within the additional stripping unit. Or in other words, if, for instance, the additional stripper unit comprises three stripper columns, then the gas obtained in step b is first passing through column 1, then column 2 and finally column 3, whereas the liquid absorbing agent is firstly passing through column 3, then column 2 and finally column 1.

In order to perform this intermediate stripping step it is necessary to adjust the temperature and the pressure of the gas as well as of the liquid streams before said streams enter the stripping unit. Furthermore, it is also necessary to adjust temperature and pressure of the streams flowing between the several stripper columns within the stripping unit. It is within the knowledge of a skilled person to determine such adequate adjustments of pressure and temperature in order for the additional stripping process or processes to be performed at appropriate conditions.

It is another aspect of the present invention to use the liquid carbon dioxide produced in step d for different purposes. Depending on the operating conditions and the chemical composition of the feed gas the product may be of food grade quality, or the product stream may be subjected to further purification in order to obtain a food grade product. However, in a preferred embodiment the liquid carbon dioxide produced in step d is used in Enhanced Oil Recovery processes or sequestration.

In yet another aspect, the present invention relates to a plant for removal of carbon dioxide from a feed gas. Said plant, which is shown in FIG. 1, comprises a stripper column (A) having a gas inlet through which the feed gas is fed and a liquid inlet through which a liquid absorbing agent is fed, said stripper column (A) being provided with a gas outlet and a liquid outlet. The gas outlet is connected to a cooling unit (D), which is connected to the liquid $CO_2$/gas separator (E), which is provided with a gas outlet and a liquid outlet, through which the recovered carbon dioxide is removed from the plant. The gas outlet of the liquid $CO_2$/gas separator (E) is connected to an absorption column (G). The absorption column (G) is provided with a gas outlet through which the treated feed gas is removed from the plant and a liquid outlet, which is connected to the stripper column (A) through a temperature rise unit (K). Furthermore, the liquid outlet of the stripper column (A) is connected to the absorption column (G) through a cooling unit (N). A heat exchange unit (J) is also provided.

Figure 2:
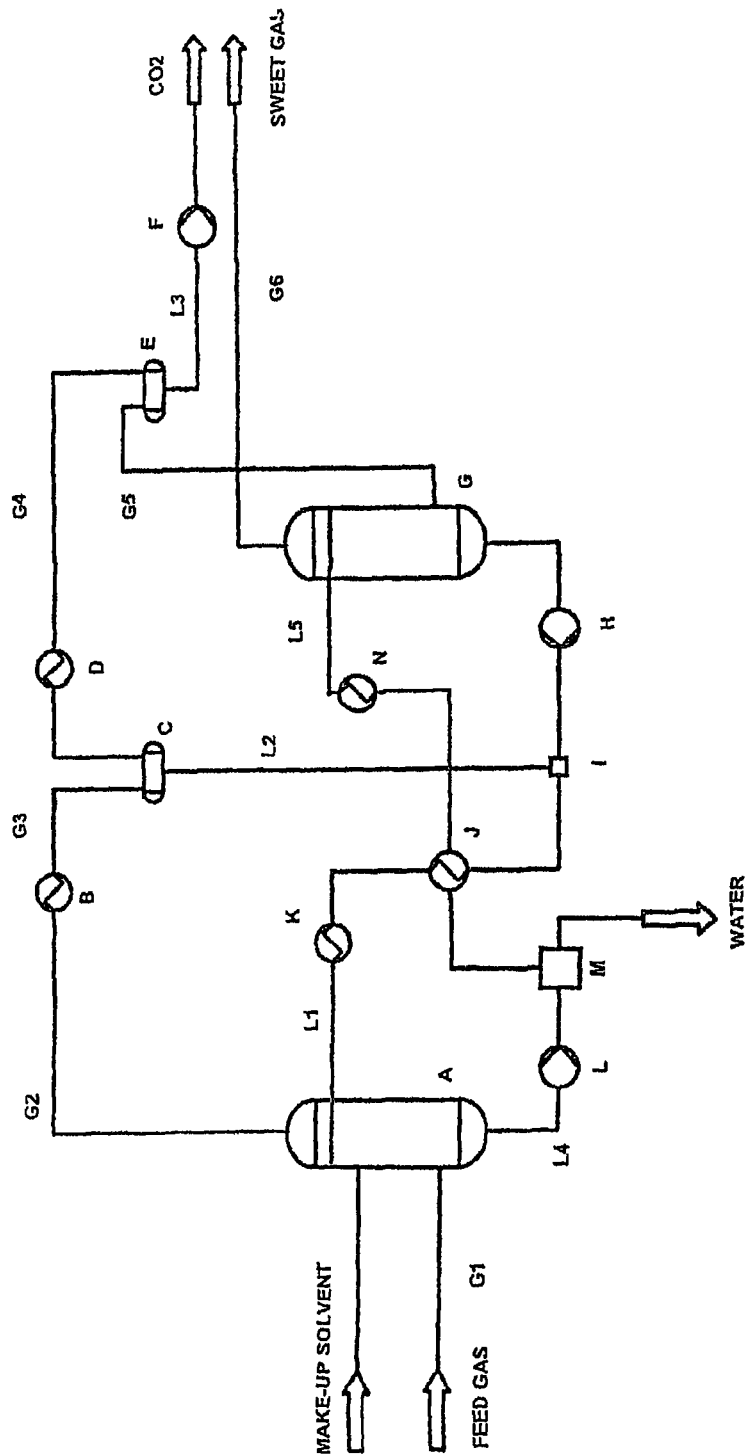
Figure 2A:
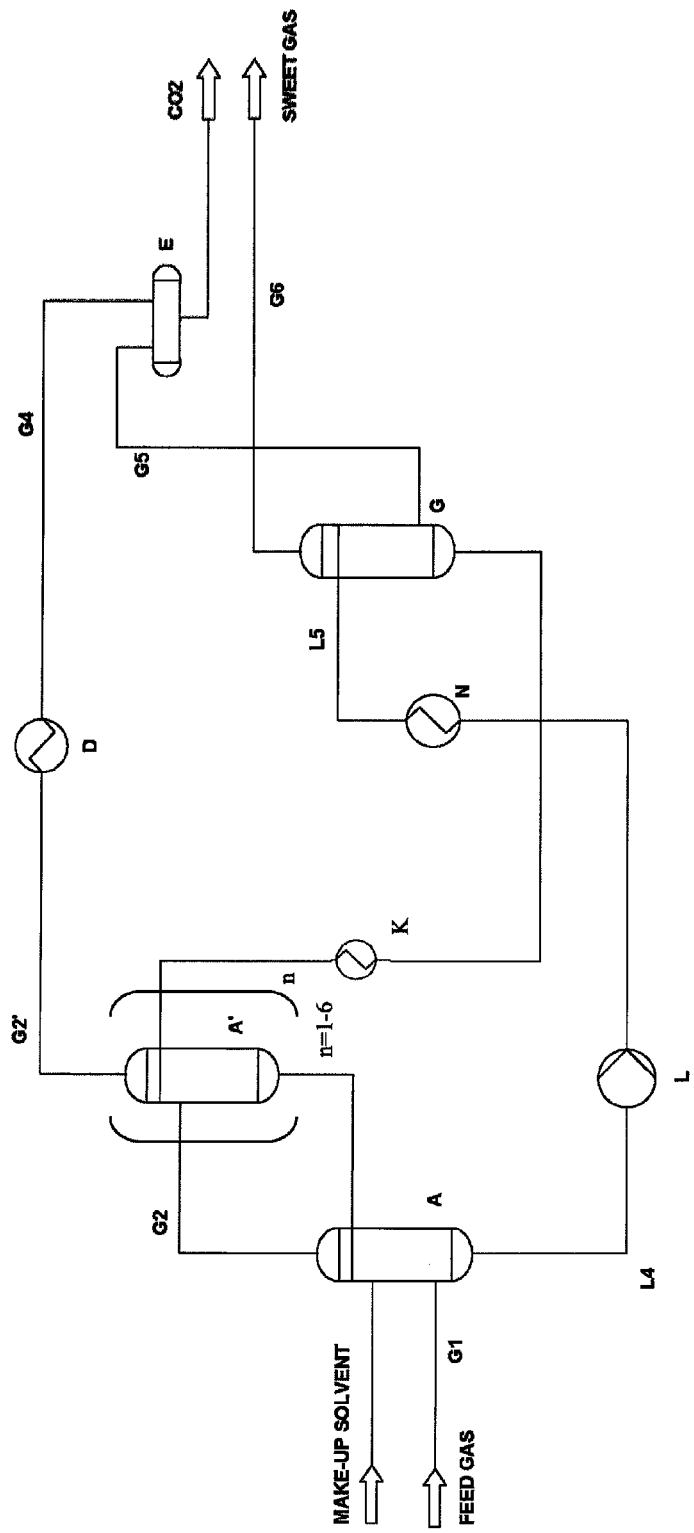

In a preferred embodiment, a water removal unit (M), as shown in FIG. 2, is situated between the liquid outlet of the stripper column (A) and the absorption column (G). Said water removal unit (M), however, is only mandatory when water is present in the feed gas.

In another preferred embodiment the liquid outlet of the liquid $CO_2$/gas separator (E) is connected to a valve, in which liquid carbon dioxide may be expanded for cooling purposes.

In one embodiment of the plant according to the present invention, the gas outlet of the stripper column (A) is connected to a cooling unit (B), which is connected to a solvent/gas separator (C). The solvent/gas separator (C) is provided with a gas outlet, which is connected to the cooling unit (D), and a liquid outlet, which is connected to the stripper column (A).

In another embodiment of the plant according to the present invention an additional stripper unit (A') is situated between the gas outlet of the stripper column (A) and the cooling unit (D), as well as between the liquid outlet of the absorption column (G) and the stripper column (A). By this construction it is possible to flow gas leaving the stripper column and liquid leaving the absorption column through this additional stripper unit (A'). It is preferred that these two streams contact each other in a counter-current flow mode within the unit.

The additional stripper unit (A') may comprise one or more stripper columns. Preferably the unit comprise one, two, three, four, five or six columns. If more than one column is present, the columns are connected consecutively.

The stripper column (A) to be used in the plant may be any column known in the art. Examples of suitable stripper columns are columns, which contain internals or mass transfer elements such as trays or random or structured packing.

The absorption column (G) to be used may be any column known in the art suitable for the performance of absorbing gaseous carbon dioxide into an absorbing agent. Examples of suitable absorption columns to be used are columns, which contain internals or mass transfer elements such as trays or random or structured packing.

The cooling units (B and D) may be any kind of refrigerator capable of cooling pressurised gases and liquids. A person skilled in the art can easily select a suitable cooling unit dependent on the required temperature to be reached and the chemical composition of the gas and liquid to be treated. Expander trains may be used for providing the necessary cooling requirement and at the same time recover energy. In a preferred embodiment said cooling units are heat exchange units.

The valve may be any valve known in the art, which is suitable for expanding liquid and gaseous carbon dioxide.

It is within the standard procedure of a skilled person to calculate the numbers and sizes of each of the above-mentioned units of the plant when the mass flow, the chemical composition, the temperature, and the pressure of each stream are known in order to obtain the most feasible mode of operating the plant.

When selecting suitable materials for each of said units, special consideration must be directed to the temperature, the pressure, and the chemical and physical properties of the gases and liquids to be treated. Such considerations will be within the knowledge of a person skilled in the art.

Furthermore, a skilled person can easily acknowledge that the selection and control of process parameters will depend on the chemical composition of the gas entering the plant as well as the chemical composition and physical condition of the gases and liquids in each step of the process. Calculations for determining the number and size of heat exchangers in order to minimize the energy consumption for heating and cooling are standard procedure for a person skilled in the art. In addition, the plant comprises liquid pumps where appropriate, such as liquid pumps (F), (L) and (H) where appropriate to facilitate transport of liquids.

In the following, the invention is described in more detail with reference to FIG. 2 and to the at present most preferred embodiment. Said figure depicts schematic flow diagrams for the $CO_2$ recovery.

EXAMPLE

For the at present most preferred embodiment, data with respect to temperature and chemical composition of the interesting gas and liquid streams are given in the table below. All percentages are based on mole fractions.

TABLE

Physical and chemical properties of selected gas and liquid streams. The working pressure is 30 bar.

| | Temp. (° C.) | $CO_2$ (mole %) | methanol (mole %) | water (mole %) |
|---|---|---|---|---|
| G1 | 35 | 17 | 0 | 0.2 |
| G2 | 49 | 33 | 2 | 0 |
| G3 | −28 | 33 | 2 | 0 |
| G4 | −53 | 33 | 0 | 0 |
| G5 | −53 | 24 | 0 | 0 |
| G6 | −50 | 2 | 0 | 0 |
| L1 | 52 | 14 | 85 | 0 |
| L2 | −28 | 24 | 75 | 0 |
| L3 | −53 | 98 | 0 | 0 |
| L4 | 42 | 3 | 97 | 0.1 |
| L5 | −50 | 3 | 97 | 0 |
| Liquid leaving the absorption column | −29 | 14 | 85 | 0 |

The gas (G1) fed to the plant is a process gas downstream the $CO_2$ shift converter in a traditional hydrogen manufacturing unit. The gas enters the plant at a temperature of about 35° C., and a pressure of about 30 bar. This pressure remains substantively constant throughout the plant. The feed gas comprises 17 mole % carbon dioxide and 0.2 mole % water. The major part of the remainder of the gas is hydrogen, but methane, carbon monooxide and nitrogen in minor amounts are also present. The recycled absorbing agent containing carbon dioxide (L1), which is also fed to the stripper column (A), enters the column at a temperature of 52° C., and the content of carbon dioxide in said liquid amounts to 14%, whereas the content of methanol (the absorbing agent) amounts to 85 mole %.

The gas (G2) leaving the stripper column (A) contains 33 mole % carbon dioxide and 2 mole % of methanol, and the temperature of said gas is 49° C. Said gas is then cooled to −28° C. (G3) and then separated into a gas and a condensed liquid (L2) comprising liquid carbon dioxide (24 mole %) and methanol (75 mole %). Afterwards the non-condensed gas, which still comprises 33 mole % carbon dioxide, is further cooled to −53° C. and then separated into a condensed liquid phase (L3) comprising 98 mole % carbon dioxide and hydrogen, methane and carbon monooxide in very small amounts. The non-condensed gas phase (G5), which comprises 24 mole % of carbon dioxide enters the absorption column (G) at a temperature of −53° C.

The liquid (L4) leaves the stripper column (A) at a temperature of 42° C. Said liquid comprises 3 mole % of carbon dioxide, 97 mole % of methanol and very small traces of hydrogen, methane and water (0.1 mole %). In the specific embodiment shown in the FIGURE, said small traces of water is then removed in the water removal unit (M), and the substantially anhydrous liquid (L) is then cooled to a temperature of −50° C. in the cooling unit (N) before entering the absorption column (G).

In the absorption column (G) the major part of carbon dioxide in the gas stream G5 is absorbed in the liquid absorbing agent (L5), and thereby producing a treated feed gas (G6), which only comprises 2 mole % of carbon dioxide and leaves the plant at a temperature of −50° C. The liquid leaving the absorption column comprises 14 mole % carbon dioxide, 85 mole % methanol and small amounts of hydrogen, methane and carbon monooxide, and leaves the column at a temperature of −29° C.

In this particular embodiment, the liquid is then mixed with the condensed liquid (L2) in the unit (I). This mixture, which comprises 14 mole % carbon dioxide and 85 mole % methanol, is then heated to 52° C. in the temperature rise unit (K) before it is fed to the stripper column (A).

In order to illustrate the advantageous mode of operation of the plant according to the present invention as compared to a traditional plant the following calculation is given below. This calculation is not meant as being limiting for the scope of the present invention.

In a plant performing the process as described above the hydrogen recovery is typically about 85%. Consequently, about 15% of the hydrogen is lost due to flushing the PSA in order to remove absorbed carbon dioxide, carbon monooxide, methane and water. If 51 tonnes of carbon dioxide is removed (as is the case in the above described example), the capacity of the PSA is increased by 9.8%, because the PSA of an existing plant will have much higher capacity and hence regeneration cycle time may be reduced.

When using steam reforming of methane gas for the hydrogen production process a yield of 4 kmole hydrogen pr. kmole of methane (in accordance with stoichiometric reaction chemistry) is obtained. In this example the hydrogen production is increased by 9.8% corresponding to 588 kmole/hr og hydrogen or 588/54=147 kmole/hr of methane is saved as a reactant. It is known that 1 kmole of methane provides an electrical effect of about 75 kWh, and hence 147 kmole methane will provide 11025 kWh, which may be used for operating the plant before break even. Hence, in the above described example the methane savings equals 11025 kWh power to be used for removing 51 tonnes of carbon dioxide, which equals 216 kWh/tonnes carbon dioxide.

The process according to the present invention is very dependent on the feasibility of operating at a low condensation temperature in the cooling circuit. If the carbon dioxide is delivered as a liquid (L3) at a pressure of 160 bar and the condensation temperature is about 45° C., then the power consumption will amount to 219 kWh/tonnes carbon dioxide. If, on the other hand, the condensation temperature is 5° C. then the power consumption will only amount to 132 kWh/tonnes carbon dioxide. However, in cases where the liquid carbon dioxide (L3) is expanded and delivered as a gas at 7 bar, the power consumption will amount to 151 kWh/tonnes carbon dioxide if the condensation temperature is set to 45° C. and 87 kWh/tonnes carbon dioxide if the condensation temperature is set to 5° C.

Hence, it is evident that the present invention presents large savings for hydrogen plant operation especially in cold areas or if sea water tempered cooling water is present.

The invention claimed is:

1. A process for removal of carbon dioxide from a feed gas comprising the steps of:
   a. feeding a feed gas and a recycled absorbing agent containing carbon dioxide to a stripper column,
   b. stripping said recycled absorbing agent containing carbon dioxide with the feed gas and thereby obtaining a gas having a higher concentration of carbon dioxide than the feed gas and a liquid of absorbing agent comprising small amounts of carbon dioxide,
   c. cooling the gas obtained in step b,
   d. separating the cooled gas obtained in step c into a carbon dioxide rich liquid and a carbon dioxide containing gas,
   e. cooling the liquid of absorbing agent obtained in step b,
   f. absorbing carbon dioxide from the carbon-dioxide containing gas obtained in step d with the absorbing agent obtained in step e, by which the carbon-dioxide containing gas is separated into a carbon-dioxide depleted gas which may be disposed of, and a liquid of absorbing agent containing carbon dioxide, and
   g. increasing the temperature and/or reducing the pressure of the liquid obtained in step f before recycling it to the stripper column.

2. The process according to claim 1, wherein the pressure of the feed gas before feeding the gas to the stripper column, is adjusted to a pressure above 3 bar or to a pressure between 6 and 160 bar, or to a pressure between 10 and 40 bar.

3. The process according to claim 1, wherein the feed gas originates from upstream hydrogen plants, downstream from PSA units, or from power plants.

4. The process according to claim 1, wherein the liquid obtained in step d is further purified.

5. The process according to claim 1, wherein the liquid obtained in step d is converted into a gas prior to purification.

6. The process according to claim 1, wherein the liquid obtained in step d is used as a cooling agent for the process by expansion and re-evaporation.

7. The process according to claim 1, wherein water is removed from the liquid of absorbing agent obtained in step b prior to cooling in step e.

8. The process according to claim 1, wherein water is removed from the feed gas prior to feeding said gas to the stripper column.

9. The process according to claim 1, wherein the absorbing agent is a physical absorbing agent.

10. The process according to claim 1, wherein an intermediate cooling/separating step is incorporated between the steps b and c, in which the gas obtained in step b is firstly cooled, whereby part of the gas is condensed, and then separated into a carbon dioxide rich gas, which is subsequently cooled in step c, and a liquid comprising absorbing agent and carbon dioxide, which is recycled to the stripper column after increasing the temperature and/or reducing the pressure.

11. The process according to claim 10, wherein the liquid comprising absorbing agent and carbon dioxide obtained in said intermediate step is mixed with the liquid obtained in step f before increasing the temperature and/or reducing the pressure in step g.

12. The process according to claim 1, wherein the process is performed at constant pressure.

13. The process according to claim 1, wherein an intermediate stripping step is incorporated between the steps b and c, in which the gas obtained in step b is pressurised before it is used for stripping the liquid of absorbing agent obtained in step f, after which said stripped liquid of absorbing agent is recycled to the stripper column.

14. The process according to claim 13, wherein said intermediate stripping step is performed one, two, three, four, five or six times by counter-currently bringing the liquid of absorbing agent obtained in step f in contact with the gas obtained in step b in a stripper unit, which comprises one, two, three, four, five or six consecutively connected stripper column(s).

15. The process according to claim 1. further comprising reforming methane gas present in the feed gas to provide hydrogen.

16. The process according to claim 9, wherein the physical absorbing agent is selected from the group consisting of methanol, a mixture of dimethyl ethers of propylene glycol and aqueous solutions of carbonates.

17. A process for removal of carbon dioxide from a feed gas, comprising:
   a. feeding a feed gas and a recycled absorbing agent containing carbon dioxide to a stripper column,
   b. stripper said recycled absorbing agent containing carbon dioxide with the feed gas and thereby obtaining a gas having a higher concentration of carbon dioxide than the feed gas and a liquid of absorbing agent comprising small amounts of carbon dioxide,
   c. cooling the gas obtained in step b,
   d. separating the cooled gas obtained in step c into a carbon dioxide rich liquid and a carbon dioxide containing gas,
   e. cooling the liquid of absorbing agent obtained in step b,
   f. absorbing carbon dioxide from the carbon dioxide containing gas obtained in step d with the absorbing agent obtained in step e, by which the carbon dioxide containing gas is separated into a carbon-dioxide depleted gas which may be disposed of, and a liquid of absorbing agent containing carbon dioxide,
   g. increasing the temperature and/or reducing the pressure of the liquid obtained in step f before recycling it to the stripper column, and
   h. recovering the carbon dioxide.

18. The process according to according to claim 17, comprising providing recovered carbon dioxide to a process selected from the group consisting of enhancing oil recovery and sequestration.

* * * * *